Dec. 3, 1940.     G. P. SANGER     2,223,641
WEEDING APPARATUS
Filed Jan. 20, 1939     3 Sheets-Sheet 1
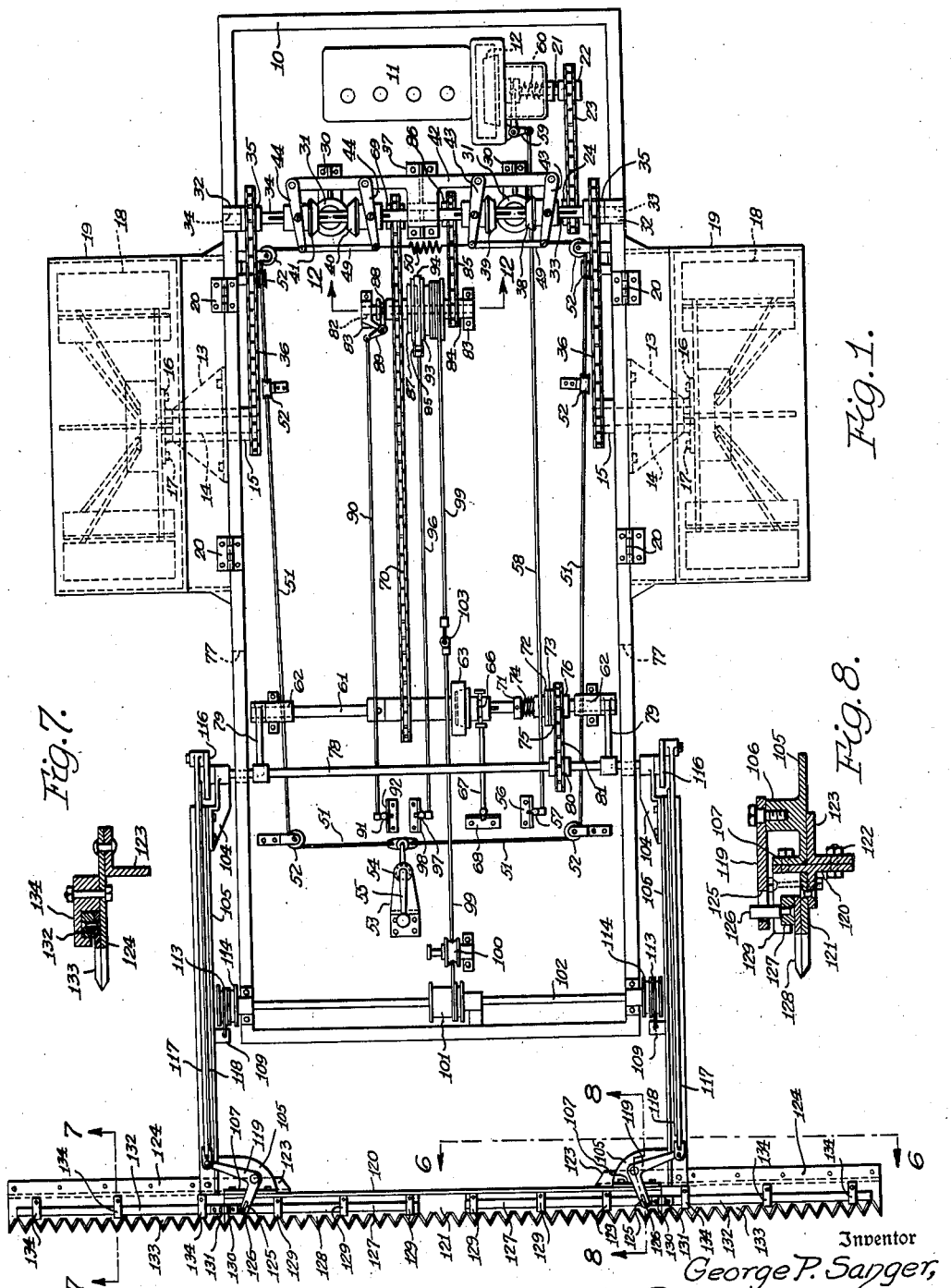
Inventor
George P. Sanger,
By
Attorneys Dec. 3, 1940.   G. P. SANGER   2,223,641
WEEDING APPARATUS
Filed Jan. 20, 1939   3 Sheets-Sheet 2
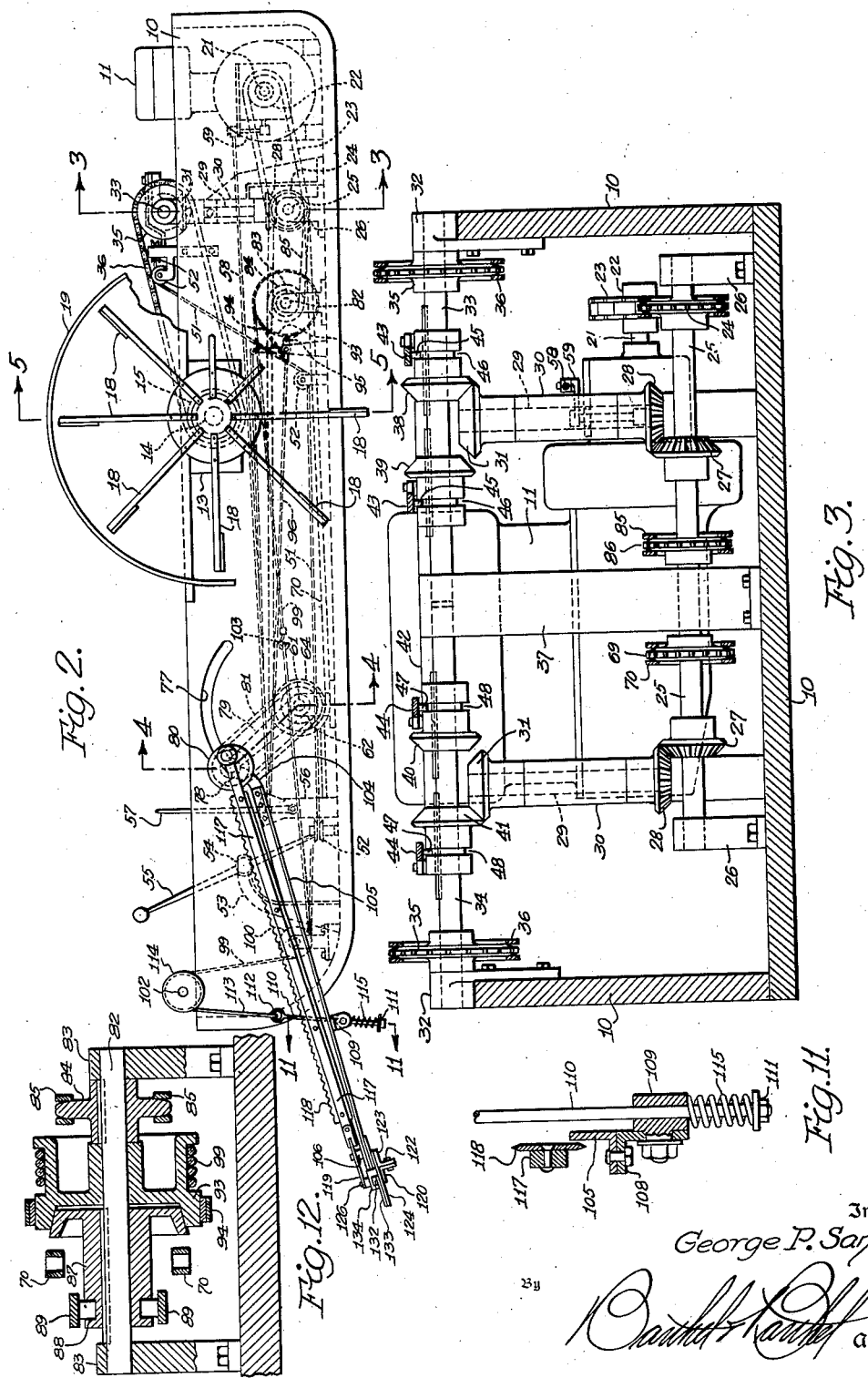
Inventor
George P. Sanger,
By
Attorneys Dec. 3, 1940.   G. P. SANGER   2,223,641
WEEDING APPARATUS
Filed Jan. 20, 1939   3 Sheets—Sheet 3
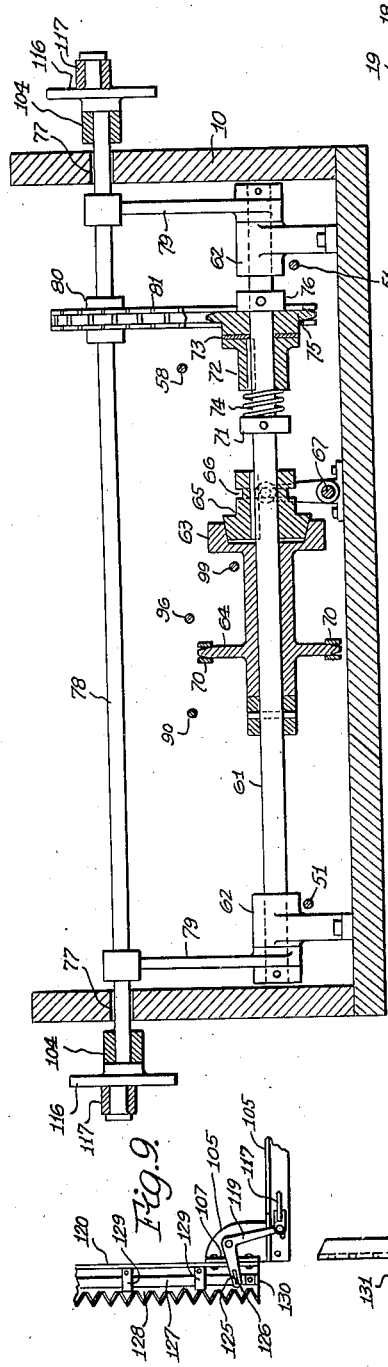
Inventor
George P. Sanger,
By
Attorneys

Patented Dec. 3, 1940

2,223,641

UNITED STATES PATENT OFFICE 2,223,641

WEEDING APPARATUS

George P. Sanger, Rockwood, Mich.

Application January 20, 1939, Serial No. 251,908

5 Claims. (Cl. 56—8)

This invention relates, in general, to weeding apparatus and, in particular, to improvements in a weeding apparatus adapted especially for marine use.

One of the objects of this invention is to provide a new and improved weeding apparatus the propulsion of which is multidirectional and speedily and selectively altered at the will of the operator and which apparatus is operable for effectively clearing in safety the weeds from substantially any locality, particularly from bodies of water.

Another object is to provide a new and improved weed cutting apparatus which, in use, is operable for cutting weeds under its own power and which, when not in use, may readily and easily be made adaptable for legal transportation over the public roads and highways.

Another object is to provide a new and improved weed cutting apparatus which is operable for being propelled over the area desired to be cleared of weeds and which is provided with a cutting mechanism which operates under normal cutting conditions but which ceases to operate under abnormal cutting conditions so as to avoid the damage thereto that would otherwise occur under said latter conditions.

Another object is to provide a new and improved weed cutting apparatus which is operable for being propelled over the area desired to be cleared of weeds and which is provided with a shock absorbing mechanism which minimizes the shock transmission through the apparatus in the event of a collision between the cutting mechanism of the apparatus and an object of obstruction in the path of travel of the apparatus.

Another object is to provide a new and improved weed cutting apparatus which is operable for being propelled over the area desired to be cleared of weeds and which is provided with a cutting mechanism supported on a floating axis so that said mechanism may be intentionally raised about said axis from said area and/or so that said mechanism and said axis are automatically movable together relatively to said apparatus in a generally rearward direction in the event of a collision between said mechanism and an obstructing object, whereby the operator is given notice of such collision and a short period of lost motion thereafter during which he may act to avoid the damage which would otherwise result.

Another object is to provide a new and improved weed cutting apparatus which has a reciprocable cutting mechanism supported on a shaft which is movable about its own axis as well as about an axis remote therefrom.

Other objects and advantages of the invention will become readily apparent from a reference to the following specification taken in conjunction with the accompanying drawings of which there are three (3) sheets and wherein:

Figure 1 is a plan view of the assembled weed cutting apparatus and showing the invention as being incorporated therein;

Fig. 2 is a side elevational view of the showing in Fig. 1;

Figs. 3, 4, 5 and 11 are sectional views, shown partly in elevation, taken along the lines 3—3, 4—4, 5—5 and 11—11, respectively, in Fig. 2;

Figs. 6, 7, 8 and 12 are sectional views taken along the lines 6—6, 7—7, 8—8 and 12—12, respectively, in Fig. 1;

Fig. 9 is a plan view of the left end portion of the main cutting unit and its support; and Fig. 10 is a plan view of one of the auxiliary cutting units which is selectively operable for being joined to one of the ends of the main cutting unit for extending the cutting expanse of the weeding apparatus.

The weed cutter shown in the figures comprises a hull 10 which is buoyant in water, which is of any desired length and which has an overall width preferably less than the legal limit for overland vehicles so as to accommodate wheels whereby the weeder may be towed or otherwise moved from place to place over the public roads. For motivating the weeder over water, which will be presently described, there is carried in the hull 10 on any suitable mounting therefor an ordinary marine engine 11 equipped in the proper manner with the usual friction clutch, shown in dotted lines at 12 in Fig. 1, through which clutch the power from said engine is selectively taken. Well above the water line of the hull 10 on the port and starboard sides of the latter there is fixedly mounted a pair of co-axially aligned bearings 13 in each of which there is rotatably carried a stub shaft 14 which protrudes at its inner end through the side wall of said hull and which extends at its outer end beyond said bearing, said inner end of each of said shafts fixedly carrying a sprocket wheel 15 and said outer end of each of said shafts being radially flanged, as at 16, for interchangeably carrying, by means of bolts 17, either a paddle wheel 18 for water travel or a road wheel (not shown) for land travel. The axes of shafts 14 are preferably so disposed that the single vertical plane including both passes through, or at least very close to, the center of gravity of the weeder so that, during land travel of said weeder, which contemplates the towing thereof on the wheels (not shown), little or no difficulty in unbalancing of said weeder will be encountered. A splash guard 19 is provided for each paddle wheel 18 and is hinged by hinges 20 to the hull 10 so that said guards may be lowered in place over said paddle wheels when the weeder is being employed in the water or so that said guards may be raised from their lateral positions out of the way when the weeder is being moved over the public roads.

As is usual the driving member (shown merely diagrammatically in the figures) of the clutch 12 is fixed on the engine drive shaft and is selectively engaged, by the operation of means to be described, by the driven member of said clutch which is fixedly mounted on a shaft 21, the latter fixedly carrying a pinion or sprocket wheel 22. In driven engagement with the pinion or wheel 22 is a drive chain 23 and in driven engagement with said chain is another sprocket wheel 24 which is fixedly mounted on a shaft 25 journalled in bearings 26 anchored to the floor of hull 10, the axis of shaft 25 being parallel to the axis of shaft 21 and both of said axes being normal to the vertical plane through the longitudinal axis of said hull. On this shaft 25 which is driven by the engine 11 through the chain 23 there is fixedly mounted in spaced relation to and faced away from each other a pair fo bevel gears 27, said gears being fixed on said shaft not only for rotation therewith but against axial movement relative thereto, and in permanently driven engagement with each of said gears 27 is a bevel gear 28 each of which is fixed for pure rotation on a vertical shaft 29, shafts 29 being supported in any well known manner, such as in vertical bearings 30 anchored to the floor of hull 10, for rotation about the spaced, fixed, vertical axes of said shafts. On the end of each shaft 29 opposite the end carrying the bevel gear 28 there is fixedly mounted for pure rotation therewith a friction clutch member 31. As clearly shown in Fig. 3, then, the driving of shaft 25 in either of its two possible rotative directions causes the driving of the shafts 29 in individually opposite rotative directions. For example, looking from the right toward Fig. 3, a clockwise movement of shaft 25 causes, if shafts 29 are viewed from the bottom, a counterclockwise movement of the right hand shaft 29 and a clockwise movement of the left hand shaft 29, the clutch members 31 being oppositely driven accordingly.

The hull 10 supports at its port and starboard sides a pair of coaxially aligned bearings 32 in one of which bearings is journalled one end of a shaft 33 and in the other of which bearings is journalled one end of another shaft 34, the axes of said shafts being in alignment and lying in that common vertical plane which includes the vertical axes of the shafts 29 and the horizontal axis of the shaft 25, said ends of shafts 33 and 34 each fixedly carrying for rotation therewith a sprocket wheel 35, and said sprocket wheels each carrying a drive chain 36 for drivingly connecting said wheels with the sprocket wheels 15 mounted on the stub shafts 14 on which the road wheels (not shown) or paddle wheels 18 are rotatably mounted. The free ends of the shafts 33 and 34 are journalled in a central bearing 37 which is anchored to the floor of the hull 10 and serves at the same time as a central bearing for the shaft 25, shafts 33 and 34 being prevented in any suitable manner from end thrust. Splined to the shaft 33 for rotation therewith and limited axial movement therealong, directly above the respective friction clutch member 31, is a friction clutch member having opposed bevelled clutch faces 38 and 39 movable together and operable at different times for clutching engagement with said member 31, and splined to the shaft 34 for rotation therewith and limited axial movement therealong, directly above the other friction clutch member 31, is another friction clutch member having opposed bevelled clutch faces 40 and 41 movable together and operable at different times for clutching engagement with said latter member 31. It will be seen, therefore, that if the shaft 25 is rotating clockwise if viewed from the right in Fig. 3, and if the clutching faces 31 and 38 and 31 and 41 are in engagement as shown in Fig. 3, each of the shafts 33 and 34 will likewise be rotating clockwise and the paddle wheels 18 (or road wheels) each turning in the same direction to propel the weeder in Figs. 1 and 2 backwardly; a counterclockwise rotation of the shaft 25 would, of course, propel the weeder forwardly, the foregoing otherwise remaining unchanged. Disengagement of the clutching faces 31 and 38 and 31 and 41, on the other hand, and engagement between the clutching faces 31 and 39 and 31 and 40, while retaining the clockwise movement of shaft 25, would propel the weeder in Figs. 1 and 2 forwardly; a counterclockwise rotation of the shaft 25 would, of course, propel the weeder backwardly, the foregoing otherwise remaining unchanged. For turning the weeder off a straight course in one lateral direction the clutching faces 31 and 38 and 31 and 40 are interengaged, the paddle wheels (or road wheels) as a result being driven in opposite directions to each other, and for turning the weeder off said course in the opposite lateral direction the clutching faces 31 and 39 and 31 and 41 are inter-engaged, the paddle wheels (or road wheels) as a result being reversibly driven in opposite directions to each other. Off-course propulsion of the weeder in either direction may also result from idling one of the two-faced clutch members and driving the other in the desired direction. Complete idling of the weeder may result by the simultaneous idling of each of the two-faced clutch members.

A stationary lever support 42 is shown as being fixedly mounted to the upper end of the central bearing 37 and is in spaced parallelsim with the shafts 33 and 34, said support having pivoted thereto one end of each lever of a double pair of levers 43 and 44, the levers of said pair 43 being spaced so as to be substantially parallel when pins 45 formed thereon intermediate their ends are in cooperative driving engagement with annular grooves 46 formed in the two opposite hub portions of the two-faced clutch member 38—39, and the levers of said pair 44 being spaced so as to be substantially parallel when pins 47 formed thereon intermediate their ends are in cooperative driving engagement with annular grooves 48 formed in the two opposite hub portions of the two-faced clutch member 40—41. A rigid link 49 of a pair thereof is pivotally secured at its ends to the free ends of the levers of each of the pairs 43 and 44, and said links are resiliently connected together at their adjacent ends by a spring 50 which normally keeps said levers in the respective positions shown most clearly in Fig. 1 which, as a result, normally keeps the clutch members 31—38—39 and 31—40—41 in the respective positions shown most clearly in Fig. 3, which means that said links and said spring tend normally to position said clutches whereby the paddle or road wheels are each driven in the same direction. Whereas the spring 50 is connected at its ends to the adjacent ends of the links 49, the remote ends of said links have connected thereto the opposite ends of a cord or cable 51 which spans a major portion of the plan area of the hull 10 and is tautly supported along its length by a system of guide pulleys 52 mounted on the sides and floor of said hull. On the floor of hull 10 near the bow thereof whereat the major portion of the operation of the weeder is to be preferably controlled a bracket 53 is anchored, said bracket supporting, by a ball and socket connection 54, a manually shiftable lever 55 the lower end of which is fixed to a portion of the cord or cable 51 thereadjacent, the ball and socket connection 54 between the bracket 53 and lever 55 being sufficiently tight or provided with various stops (not shown) so that any selected relative position between said bracket and said lever may be maintained as long as desired without unintentional change thereof. It is clear, then, that the operator, when facing the bow of the hull 10 and pulling all the way back on the lever 55, causes the clutch faces 38 and 41 to become disengaged from the clutch members 31, against the force of the spring 50, and brings the clutch faces 39 and 40 into engagement with said clutch members to reverse the direction of propulsion of the weeder, it being obvious from the foregoing that a semi pull on said lever will break any clutching between said faces and said members to cause coasting of the weeder; a pull on said lever toward the starboard side of said hull will not disturb the relationship shown in Fig. 1 between the clutch member 31 and the clutch faces 38 and 39 because the spring 50 normally keeps said member and said faces in such relative positions, but such a pull will disengage the clutch member 31 and the clutch face 41 and bring into engagement the clutch member 31 and the clutch face 40 for causing the paddle or road wheels to rotate in opposite directions to drive the weeder in one direction angularly from a straight course; a pull on said lever toward the port side of said hull will effectuate, in a manner which should now be clear, a deviation from said straight course in the opposite angular direction; and, semi port or starboard pulls on said lever will effectuate an idling of one paddle or road wheel without disturbing the movement of the other.

Also anchored near the bow of the hull 10, for remotely controlling the engagement or disengagement of the friction clutch 12, is a bracket 56 which has pivotally connected thereto about a horizontal axis a manually operable lever 57 to the lower end of which is fastened one end of a cord or cable 58, the other end of said cord or cable being fastened to one end of a horizontally arranged bell crank 59, said bell crank being pivoted about a vertical axis intermediate its ends to the engine housing and its free end being in axially driving engagement with the hub portion of the driven clutch member of the clutch 12. Since it is preferable to use a cord or cable, such as 58, as a connecting means between the lever 57 and bell crank 59, it is then essential that the driven member of the clutch 12 be provided with a spring 60 which normally keeps said member in one of its extreme axial positions and opposes movement toward the other of its extreme axial positions, a rearward pull on said lever counteracting the opposition of said spring, a stop (not shown) on the bracket 56 holding said lever in its new position, and said spring returning said clutch member, when desired, to its normal position; however, said cord or cable could be replaced by a rod (not shown), in which event the spring 60 could be eliminated but the lever 57 would then have to be moved manually in either direction to change the position of the clutch member from one to the other of its positions.

In forwardly spaced relation to the shaft 25 and in parallelism therewith there is rotatably supported a shaft 61 in coaxially aligned bearings 62 anchored to the floor of hull 10, and on shaft 61 there is freely mounted a friction clutch member 63 having formed on its hub portion a sprocket 64. (See Figs. 1 and 4.) Splined to the shaft 61 for rotatably driving same and for axial movement therealong toward and from the freely rotatable clutch member 63 is a clutch member 65 operable for selectively engaging and disengaging the clutch member 63. Clutch member 65 is annularly grooved at 66 on its periphery for receiving the forked end of a manually operable lever 67 which is supported intermediate its ends for proper movement thereof by a bracket 68 anchored to the floor of the hull 10 in the vicinity of the brackets 53 and 56. It will be seen that the operator needs only to move the lever 67 by its handle relatively to the bracket 68 laterally toward the port or starboard sides of the hull to obtain the desired engagement between or disengagement of the clutch members 63 and 65 to drive or idle the shaft 61, clutch member 63 being backed up by a stop or other means on said shaft to oppose the axial thrust of the clutch member 65 during engagement therebetween.

The clutch member 63 is freely driven on the shaft 61 by and in accordance with the rotation of the shaft 25 by means of a sprocket wheel 69 fixedly mounted on shaft 25 for rotation therewith through the agency of an endless chain 70 geared about the sprocket wheel 69 and the sprocket 64 formed on said clutch member 63, shaft 25, as has been described, being driven by the engine 11 and itself, in addition to driving the member 63, driving the shafts 33 and 34.

Mounted on the shaft 61 in spaced relation to the end of the driven clutch member 65 opposite its clutching end is an axially adjustable stop member 71, and spaced from said stop member in splined engagement with said shaft is an annular member 72 provided with a friction plate 73, there being a spring 74 telescopically arranged about said shaft between said stop member and said annular member for urging the latter axially away from said stop member along its splined connection with said shaft. Adjacent the friction plate 73 carried on the annular member 72 there is freely mounted on shaft 61 a sprocket wheel 75 which has a clutching face cooperable with said plate so as to be frictionally driven thereby. Sprocket wheel 75 is backed up on shaft 61 by an adjustable stop member 76 which opposes the force of the spring 74 and permits a driving contact between the faced member 72 and the sprocket wheel 75 to be driven thereby, said contact being sufficiently effective to drive said sprocket wheel under conditions of normal pull thereon (to be described) and yet being preferably insufficient, by proper adjustment of the stop or stops, to drive or continue to drive said sprocket wheel under conditions of abnormal pull thereon (to be described).

The port and starboard walls of the hull 10 are each arcuately slotted, as at 77, above and about the axis of the shaft 61, and through said slots extend the ends of a swingable and rotatable shaft 78, the axes of shafts 61 and 78 being parallel. Shaft 78 is supported intermediate the walls of slots 77 by means of lever arms 79 which are each freely carried at one end by the shaft 61 and each of which at the other end freely carries the shaft 78 for rotation about its own axis and about the axis of shaft 61 along and relatively to said slots. Due to the weight of the mechanism (to be described) carried by the shaft 78 ahead of the vertical plane through the axis of the shaft 61, shaft 78 is normally supported by the lever arms 79 at or very close to the head end of each of the slots 77. For rotatably driving the shaft 78 about its own axis said shaft has fixedly mounted thereon for said rotation therewith a sprocket wheel 80, and an endless chain 81 is connected between said sprocket wheel and the sprocket wheel 75 which is carried by the shaft 61 and frictionally driven by the annular member 72. The rotatable driving of shaft 78 about its own axis is, therefore, dependent upon the load thereon, the desirability of providing for slippage between the member 72 and sprocket wheel 75 under abnormal pull on said sprocket (by the shaft 78) having been previously explained.

Spaced between and in parallelism with the shafts 25 and 61 is another shaft 82 journalled for rotation in spaced bearings 83 anchored to the floor of hull 10. Shaft 82 has splined thereto for being rotatably driven thereby a sprocket wheel 84, and an endless driving chain 85 is connected between said sprocket wheel and another sprocket wheel 86 which is fixedly mounted on shaft 25 for rotation therewith. Shaft 82 is, therefore, rotated by and in accordance with the shaft 25.

Also mounted for rotation on the shaft 82 in splined engagement therewith is a friction clutch member 87 the periphery of the hub of which is annularly grooved as at 88 to receive the forked end of a bell crank 89 which is vertically pivoted intermediate its ends to a portion of the bearing 83 thereadjacent. The free end of the bell crank 89 has pivotally fixed thereto one end of a stiff link 90, the other end of said link being pivotally connected to and intermediate the ends of a manually operable lever 91 which is mounted on a bracket 92 for a plurality of variable positions with respect thereto, said bracket being anchored to the floor of hull 10 in the vicinity of the brackets 53, 56 and 68. It will be seen, then, that the lever 91, when pushed forwardly, forces the clutch member along its splined connection on the shaft 82 toward the port side of the hull 10, and, when pulled rearwardly, forces said member toward the starboard side of said hull.

Freely mounted on the shaft 82 between the sprocket wheel 84 and the clutch member 87 which are splined to for rotation on said shaft is another clutch member 93 which is operable for being selectively engaged by the clutch member 87 to be driven thereby. Member 93 on its periphery carries a spring brake band 94 of usual construction and the ends of which band are interconnected through a centrally pivoted link 95, link 95 being movable about its pivot to draw together or separate the ends of said link for tightening or loosening said band on or from member 93 by means of a rod 96 one end of which rod is pivotally connected to an offset portion of said link and the other end of which rod is pivotally connected to a manually operable lever 97, said lever being pivotally mounted on a bracket 98 anchored to the floor of hull 10 in the vicinity of the other brackets 53, 56, 68 and 92. It will be seen in Fig. 2 that movement of the lever 97 forwardly about its pivot causes the link 95 to move clockwise about its own pivot to loosen the brake band 94 about the clutch member 93, and that rearward movement of said lever causes counterclockwise movement of said link to tighten said band on said member. In other words, the braking of clutch member 93, since said member is free on the shaft 82, is effective in holding said member against undesired rotation of said member about the axis of said shaft when said member and the other clutch member 87 are out of engagement.

The clutch member 93 which is selectively driven by the clutch member 87 and which is selectively stopped or kept from moving by the brake band 94 has one end of a cable 99 secured to its periphery and carries thereon a plurality of windings of said cable, the other end of said cable passing under a sheave 100 anchored to the floor of hull 10 and then upwardly to be wound around and secured to a drum 101 mounted for rotation on and with a shaft 102 which is supported for rotation by the port and starboard side walls of said hull. Although the main object of this arrangement is soon to be discussed, it will be noted in Fig. 1 that the cable 99 intermediate its ends may be provided with a removable connection 103 so that, upon being disconnected thereat, that portion of the cable which is wound around the clutch member 93 may be pulled outwardly through the bow of the hull 10 and secured to a fixed object (not shown), such as a stake to which the weeder is to be tied, or such as a truck upon which the weeder is to be transported overland. When so secured to said fixed object, it being presumed that the paddle wheels 18 have been removed from their mountings and that the weed cutting section of the weeder has been raised, it will be seen that the weeder may be drawn toward said object under its own power by engaging the clutch members 87 and 93 and causing forward movement of the weeder by the re-winding of the cable 99 on the member 93.

The floating shaft 78 which is carried in the arcuate slots 77 by the arms 79 for rotation about its own axis as well as for rotation about the axis of its driving shaft 61 freely carries thereon outwardly of each side of the hull 10 a bracket 104, and to each of these brackets is fixed one end of an angle support 105, supports 105 extending forwardly from the shaft 78 in parallelism and terminating at a distance substantially ahead of the bow of hull 10. The outer end of each of the supports 105 is provided with an upstanding boss formation 106 and an upstanding flange 107, formations 106 being equally spaced from the axis of shaft 78 and flanges 107 being equally spaced ahead of said formations. On each support 105 at an equal distance behind the boss formation 106 thereon there is fixed an angle piece 108, and on each angle piece is carried a vertically bored lug 109 in each of which lugs is reciprocably mounted a rod 110. The lower end of each rod 110 carries a nut and washer unit 111 and the upper end of each of said rods has an eye formation 112 to each of which eye formations is fastened one end of a cable 113, each of said cables 113 extending upwardly from its respective rod 110 and being wound around and secured to a drum 114 fixedly mounted on the end of shaft 102 for rotation therewith. Telescopically arranged on each rod 110 between its respective lug 109 and nut and washer unit 111 is a spring 115. Since the angle supports 105 are connected intermediate their ends through the cables 113 to the shaft 102, unitary movement of said supports upwardly about the axis of the shaft 78 is effectuated by the engagement between the clutch members 87 and 93, the braking action between the clutch member 93 and the brake band 94 being selectively operable for holding the supports 105 in any desired position of inclination relative to the horizontal, and the unitary downward movement of the supports 105 about the axis of the shaft 78 being effectuated by their own weight together with the release, to any desired extent, of the brake band 94 from the clutch member 93. The springs 115 tend to absorb the shock which would otherwise be transmitted through the cables 113 and 99 by an unexpected downward force applied at the outer ends of the supports 105.

Axially outwardly of each bracket 104 shaft 78 fixedly carries a disc 116 for rotation therewith, each of said discs having pivotally mounted thereon eccentrically to the axis thereof an arm 117, arms 117 extending forwardly in parallelism with each other and being disposed slightly above and laterally of the angle supports 105 which are freely carried on said shaft by said brackets. Each arm 117 has mounted thereon for the reciprocatory movement therewith due to the eccentricity of the connection between said arm and the rotatable disc 116 a double edged knife 118 extending for substantially the entire length of said arm, said knives and the upstanding portions of the supports 105 cooperating to provide shearing means for those weeds or that debris which would otherwise work into the hull 10 and foul the mechanism therein. The end of each arm 117 opposite the end thereof which is pivotally mounted on the disc 116 is connected for universal movement to one end of a bell crank 119, said bell cranks being pivotally anchored intermediate their ends to the boss formations 106 formed on the supports 105. The knife-carrying arms 117, therefore, are driven upwardly and downwardly and forwardly and backwardly by their driving discs 116 to which they are eccentrically mounted, and this complex movement not only is guided by the bell cranks 119 but drives said cranks oscillatably about their pivoted mountings.

Referring particularly to Fig. 8, it will be seen that one of the lateral elements of an elongated T-bar 120 is arranged on and rigidly secured to the forward faces of the upstanding flanges 107 on the supports 105, the length of said T-bar being substantially equal to the distance between the outer edges of said flanges when said supports are parallel, and on the upper surface of the central element of said T-bar is arranged and rigidly secured thereto a flat, elongated cutter bar 121 of saw tooth formation and of a length substantially equal to that of said T-bar, said cutter bar extending forwardly outwardly from said T-bar and representing the stationary cutting element of the weed cutting mechanism since same is rigidly supported by the supports 105. If it is desired to increase the lateral expanse of the cutting mechanism over that provided by the above and still retain the feature of legal land transportability of the weeder, to the other lateral element of each T-bar 120, below each flange 107, is removably secured by bolts or other suitable means 122 an angle bar 123, said angle bars extending laterally outwardly from said T-bar for any desired distance and each having rigidly secured to its upper surface a flat cutter bar 124 (see Fig. 7) of saw tooth formation, cutter bars 124 being of such a width and being arranged on said angle bars 123 in such a manner that they lie end to end with the cutter bar 121 and the cutting edges thereof are in alignment with the cutting edge of the cutter bar 121 to provide a substantially continuous stationary cutting edge across the entire laterally extended cutting mechanism. It is clear that the weeder may be employed with or without the cutter bars 124 and their supporting angle bars 123 and that these auxiliary units are easily and readily assembled to and disassembled from the weeder.

Again referring to Fig. 8, the free end of each bell crank 119 is slotted, as at 125, to receive a pin 126 which is fixedly mounted in an elongated bar 127, said bars being longitudinally aligned and the total length of said two bars being less than the length of the stationary cutter bar 121 so as to be movable toward and from each other relatively to said cutter bar without extending beyond the ends of the latter. To the bottom of each bar 127, along its length, there is welded or otherwise fixedly secured a cutter bar 128 of saw tooth formation, bars 128 being in metal-to-metal contact with the cutter bar 121 and being reciprocably driven with bars 127 by the cranks 119 for cooperating with the stationary bar 121 to provide an effective cutting means for weeds and other such matter coming in contact therewith. To guide the cutter bars 128 in their reciprocating movements a plurality of channelled guide members 129 are provided between the T-bar 120 and the rear edges of the bars 127 and 128, said members being secured at spaced intervals to the bars 121 and 120 and arranged in overlapping engagement with the bars 127. It will be noticed in Fig. 1 that the arms 117 which drive the bell cranks 119 have the same angle of eccentricity with respect to the axes of the discs 116 mounted for rotation on and with the shaft 78, and that the bell cranks 119 are arranged in opposition to each other, the result being that rotation of the shaft 78 causes the reciprocable cutter bars 128 to move along the cutter bar 121 either simultaneously toward each other or simultaneously away from each other, this arrangement necessitating the employment, as disclosed, of the two spaced cutter bars 128. It is clear, however, that a single reciprocable cutter bar could replace the two bars shown by merely doing away with the opposed relationship of the bell cranks and maintaining the disclosed eccentricities of the arms, or by maintaining the disclosed opposition between the cranks and angularly spacing the eccentricities 180°. The invention contemplates the arrangement shown and the other arrangements suggested immediately above or their equivalents.

If it is desired to increase the lateral expanse of the cutting mechanism of the weeder, as has already been suggested in the consideration of the bar supports 123 and cutter bars 124, the reciprocable bars 127 which carry the cutter bars 128 are either upwardly flanged laterally outwardly from the pins 126 or are provided thereat with upstanding lugs 130, and to these lugs or flanges are bolted or otherwise removably secured upstanding portions 131 of bars 132, each bar 132 being longitudinally aligned with the bar 127 to which it is secured. Each bar 132 has riveted or otherwise rigidly secured thereto, at its under surface, a cutter bar 133 of a length substantially equal to the cutter bar 124 upon which it is supported and along which, in unison with the movement of the cutter bar 128 thereadjacent, it cooperatively reciprocates. Channelled guide members 134, similar to the guide members 129, are rigidly secured at spaced intervals to the stationary cutter bars 124 and are arranged in overlapping engagement with the bars 132.

Power is taken from the engine driven shaft 25 to the clutch member 63 on the shaft 61 through the chain 70, said shaft 61 being selectively driven by proper manipulation of the lever 67 to engage the clutch members 63 and 65 on said shaft 61. The rotative power of shaft 61 is transmitted substantially positively to the shaft 78 through the chain 81, though the limit of positiveness is dependent upon the opposition in shaft 78 to the friction between the members 72 and 75 on said shaft 61. If the opposition to such friction is not above normal, the shaft 78 will be driven by the shaft 61 and will, in turn, drive the eccentrically mounted arms 117 to actuate the cutter bars 128 and 133 reciprocably along the stationary cutter bars 121 and 124; but, if the opposition to such friction is above normal, such as when the relatively movable cutter bars meet with abnormal cutting resistance, then the driven member 75 on shaft 61 will slip with respect to the driving member 72 thereon and rotation of shaft 78 and reciprocation of cutter bars 128 and 133 will cease.

At the same time the member 63 on shaft 61 is driven by the shaft 25, the shaft 82 is positively driven by the shaft 25 through the chain 85 because of the direct connections between said chain and the sprocket wheel 84 on said shaft 82 and between said latter shaft and said sprocket wheel. This rotative power of shaft 82 is selectively transmitted therefrom in desired amount to the shaft 102 by the proper manipulation of the lever 91 to engage the members 87 and 93 on said shaft 82, and the release of said members at the same time the lever 97 is properly manipulated to tighten the brake band 94 about the member 93, when the shaft 102 has been rotated through the desired arc, will maintain the shaft 102 in its desired position. In other words, the entire cutting mechanism of the weeder may thus be raised relatively to the weeder proper about the axis of the shaft 78.

It is also important to note again that the selectively rotatable shaft 78 is carried in the arcuate slots 77 formed in the hull 10 and that movement of said shaft about the axis of the shaft 61 is possible because of the arms 79 which interconnect said shafts. This means that the cutting mechanism of the weeder, upon hitting some unseen obstruction in the path of travel, will back up relatively to the weeder proper, and this movement will be the danger signal to the operator to act accordingly as well as giving him time to so act. The occurrence and duration of this lost motion of the cutting mechanism will enable the operator, before serious damage results, either to change the course or stop the forward motion of the weeder, by proper manipulation of the lever 55, and/or to raise the cutting mechanism of the weeder out of the way of the obstruction, by proper manipulation of the lever 91 and properly timed manipulation of the brake lever 97. Much of the shock resulting from the striking of the obstruction, and which would tend to travel through the weeder, is eliminated by the provision of the shock absorbing means shown in detail in Fig. 11 and in assembly in Fig. 1.

Before and after the weeding process, land transportation of the weeder, either by the towing or actual carrying thereof, is legally possible. During weeding, the ease in maneuvering the weeder and the speed with which the various operations of which the weeder is capable of performing may be stopped, started or changed are features which permit the weeder to be safely and effectively employed in substantially any locality where weeding is desired. After the weeding is completed, it is possible for the weeder to move under its own power onto or up to the vehicle which is to take it away or onto the beach or bank for temporary stationing thereat.

The description of the driving arrangement for the paddle wheels is detailed and is necessarily directed to the arrangement shown, but it is contemplated that any well known arrangement which is capable of producing similar results may be substituted. Also, the power for raising and reciprocating the cutting mechanism is shown and has been described as being taken off the shaft 25 which shaft also furnishes the power for the paddle wheels, but it is contemplated that said raising and reciprocating power may be supplied by means other than and independent of the means shown.

It is also clear that the weeder may be made adaptable for propulsion under its own power overland and for weeding on land by the substitution of road wheels for the paddle wheels and the provision in any well known manner of wheels at or near the bow of the hull, and the invention contemplates such substitution and provision.

Although the invention has been described with some detail it is to be understood that such description is for the purpose of illustration only and is not to be taken as definitive of the limits of the inventive idea. The right is reserved to make such changes in the details of construction and arrangement of parts as will fall within the purview of the attached claims.

What I claim is:

1. In a weeding apparatus, a cutting mechanism comprising, a pair of elongated cutting elements arranged one above the other and in close proximity to each other, means for longitudinally reciprocating said elements relatively to each other, said elements having saw-toothed cutting edges cooperable to provide a shearing action therebetween, and auxiliary cutting elements readily assembled on and removable from said first cutting elements for movement in accordance therewith and to vary at will the longitudinal expanse of said cutting mechanism.

2. An apparatus comprising, a body movable over an area to be weeded, a cutter carried by said body in a normally lowered position with respect to said area and about an axis normal to the direction of movement thereof, means operatively connected to said cutter for selectively moving the latter into and from said position about said axis, means operatively interconnecting said cutter and said body to accommodate a movement of said cutter downwardly beyond said position relatively to said first means during movement of the latter, and means between said cutter and said first means to accommodate a lost motion therebetween.

3. An apparatus comprising, a body movable over an area to be weeded, a cutter carried by said body about an axis normal to the direction of movement thereof, means operatively connected to said cutter for selectively moving the latter toward and from the area about said axis, means operatively interconnecting said cutter and said body to accommodate a lost motion therebetween during movement of the latter, and resilient means between said cutter and the connection thereof with said first means to accommodate a lost motion therebetween.

4. In a weeding apparatus, a cutting mechanism comprising, cutting means supportable in weeding position over the area to be weeded thereby, a pair of shafts supported for rotation about spaced, parallel axes, one of said shafts carrying for rotation therewith driving means therefor and driving means operatively connected to said cutting means for reciprocating the latter relatively to said area, the other of said shafts carrying for rotation therewith driving means therefor and the driving section of a friction clutch, the driven section of said clutch being engageable with said driving section and freely carried on said last mentioned shaft, means rigidly interconnecting said shafts for permitting arcuate movement of one thereof about the axis of the other thereof, and means operatively interconnecting said first driving means and said driven clutch section for permitting the latter to drive the former upon inter-engagement of said clutch sections and during said arcuate movement of said one shaft relatively to said other shaft.

5. In a weeding apparatus, a cutting mechanism comprising, cutting means supportable in weeding position over the area to be weeded thereby, a pair of shafts supported for rotation about spaced, parallel axes, one of said shafts carrying for rotation therewith driving means therefor and driving means operatively connected to said cutting means for reciprocating the latter relatively to said area, the other of said shafts carrying for rotation therewith driving means therefor and the driving section of a friction clutch, the driven section of said clutch being selectively engageable with said driving section and freely carried on said last mentioned shaft, means freely received by said shafts and rigidly interconnecting same for maintaining said axial spacing and permitting arcuate movement of one thereof about the axis of the other thereof, and means operatively interconnecting said first driving means and said driven clutch section for permitting the latter to drive the former upon inter-engagement of said clutch sections and during said arcuate movement of said one shaft relatively to said other shaft.

GEORGE P. SANGER.